(12) United States Patent
Figgis et al.

(10) Patent No.: US 7,033,088 B2
(45) Date of Patent: Apr. 25, 2006

(54) CAMERA RIG

(75) Inventors: Michael Figgis, London (GB); Ben Wilson, Harnet (GB)

(73) Assignee: Red Mullet Limited, London (GB)

( * ) Notice: Subject to any disclaimer, the term of this patent is extended or adjusted under 35 U.S.C. 154(b) by 0 days.

(21) Appl. No.: 10/470,739

(22) PCT Filed: Feb. 11, 2002

(86) PCT No.: PCT/GB02/00594

§ 371 (c)(1),
(2), (4) Date: Dec. 8, 2003

(87) PCT Pub. No.: WO02/065206

PCT Pub. Date: Aug. 22, 2002

(65) Prior Publication Data

US 2004/0096208 A1    May 20, 2004

(30) Foreign Application Priority Data

Feb. 9, 2001 (GB) .................................. 0103279

(51) Int. Cl.
*G03B 17/00* (2006.01)
(52) U.S. Cl. ...................................... 396/420; 396/422

(58) Field of Classification Search ........ 396/419–422, 396/425, 428
See application file for complete search history.

(56) References Cited

U.S. PATENT DOCUMENTS

| | | | | |
|---|---|---|---|---|
| 3,650,195 A | * | 3/1972 | Jones | 396/422 |
| 3,893,145 A | * | 7/1975 | King | 396/422 |
| 4,272,177 A | * | 6/1981 | Ottenheimer | 396/423 |
| 4,727,390 A | * | 2/1988 | Brown | 396/420 |
| 5,389,987 A | * | 2/1995 | Corbeil et al. | 396/420 |
| 5,890,025 A | | 3/1999 | Hart | 396/420 |

FOREIGN PATENT DOCUMENTS

| | | |
|---|---|---|
| DE | 10 26 622 B | 3/1958 |
| GB | 1 525 097 A | 9/1978 |

* cited by examiner

*Primary Examiner*—Christopher Mahoney
(74) *Attorney, Agent, or Firm*—Arent Fox PLLC; Wilburn L. Chesser

(57) ABSTRACT

According to a first aspect of the present invention there is provided a camera rig suitable for handheld use comprising a frame and means to attach a camera inside of said frame. The present invention therefore provides a mobile support for a camera, such as a digital video camera by providing a larger grip than a small camera and hence it is easier to hold steady. Therefore the user may shoot film in a steady manner. It is thus an advantage of the present invention that camera shake is either prevented or substantially reduced.

18 Claims, 3 Drawing Sheets

CAMERA RIG

CROSS-REFERENCE TO RELATED APPLICATION

This application is a National Stage entry of International Application No. PCT/GB02/00594, filed Feb. 11, 2002, the entire specification claims and drawings of which are incorporated herewith by reference.

The present invention relates to a camera rig, and particularly although not necessarily exclusively relates to a camera rig for use with a digital video camera.

Digital video cameras have become very popular due to their inherent advantages. These advantages include being able to download the shot film onto a personal computer. This allows the editing to be achieved easily and quickly.

As digital video cameras have become more popular over the last few years they have, due to increased understanding and better technologies, become smaller. This offers the advantage tat they are more easily transportable. However, there are a number of problems ted with small video cameras. One such problem is that it is difficult to shoot steady film. By film it is meant a series of images stored as a set of data. When film is taken by a camera that has not been supported it is usual to find that the resultant film shakes. This is due to the user moving the camera through the filming process. This phenomenon is generally termed camera shake.

It is known to attach cameras to free standing supports, often termed tripods. Tripods allow the camera to be supported and lace allows ease of taking film without any resultant camera shake. However, the problem with a tripod arrangement is that it is not particularly mobile and hence the resultant drawback encountered when filming in a confined area, or when the cameraman is required to move when filming. It is therefore a general aim of tie present invention to overcome or ameliorate the problem of camera shake whilst still gig the user of the camera the mobility to move the camera to different locations while filming.

Digital video cameras are also agile. In a busy working environment it is not uncommon for a camera to be dropped. Cameras are, in the main, not very robust and hence damage can often be incurred following it being dropped Therefore the present invention also seek to provide means to prevent damage should the camera be inadvertently dropped. The present invention particularly seeks to overcome the problem of damage to a camera through dropping or accident when the camera is not mounted on a tripod.

Digital video cameras also have further inherent disadvantages. These include the need for a user, if reasonable film is to be taken, to devote both hands to the camera Therefore if other accessories are required, such as a microphone or a light source a second person is required. Alternatively the cameraman must attempt to use both pieces of equipment simultaneously. This causes poor film quality. The present invention attempts to provide a solution to this problem, whilst still attempting to overcome the disadvantages of a tripod arrangement.

The present invention aims to address to the above problem by providing a camera rig which is capable of securely holding a camera and preferably one or more ancillary devices, and that in use or transport is easily moved.

Equipment for filming and photography is in the main expensive. Therefore it is also a preferred aim of the present invention to provide a cost effective frame structure may be easily manufactured, whilst being robust that solves the above problems.

According to a fist aspect of the present invention there is provided a camera rig suitable for handheld use comprising a frame and means to attach a camera inside of said frame.

The present invention therefore provides a mobile support for a camera, such as a digital video camera by providing a larger grip than a small camera and hence it is easier to hold steady. Therefore the user may shoot film in a steady manner. It is thus an advantage of the present invention that camera shake is either prevented or substantially reduced.

According to a second aspect of the present invention there is provided a camera rig comprising a frame capable of securely holding a camera and at least one further piece of equipment.

According to a third aspect of the present invention there is provided a camera rig comprising a frame and a camera support means mounted on the frame, the frame comprising at least two grip portions spaced from one another on opposite sides of the camera support means. The camera support means can be integral with the frame.

Desirably the frame comprises an outer frame and an inner frame mounted on the outer frame. Ideally the inner frame is provided with the camera support means. It is preferred that at least part of the inner frame on which the camera is mounted is moveable with respect to the remainder of the frame. Thus the position of the camera is adjustable with respect to the frame.

The outer frame can be substantially circular. Alternatively, the outer frame can be substantially elliptical. More preferably the inner frame comprises an H-frame. Conveniently the H frame may be fixed inside the outer frame.

In use, it is preferred that the camera is fixed to the centre bar of the H-frame. It is to be appreciated that various other shaped frames may be mounted within the circular frame, including one or more substantially horizontal or vertical bars.

In a preferred embodiment of the present invention the centre bar of the H-frame is capable of movement with respect to the remainder of the frame.

In an alternative arrangement the frame may be U-shaped with the camera support means mounted substantially in the centre of the U, dissecting the upwardly directed arms of the U. In this embodiment, the upwardly directed arms would each carry a grip portion.

Ideally a handle portion is provided to engage an opposite side of the frame to the camera support means. This arrangement enables a camera to be attached and removed from the support means more conveniently than when the frame is held by the grip portions alone. The handle may be provided with securing means which can pass through an aperture in the frame and the support means to engage the camera and hold it in engagement with said support means. These securing means could be a screw fixing or any other suitable means.

It is preferred that the frame is made from aluminium. This has advantages in that it is light and strong.

Alternatively, the frame may be made from a plastics material. One suitable plastics material is welded PVC, this and other suitable plastics materials can allow the frame to be of an inflatable construction. Not only does this result in a light weight frame to ease operation thereof but also this alleviates the likelihood of damage to the camera mounted on or in the frame in the eat of the frame being dropped. The frame may, alternatively, be made out of a hardened plastics material.

Preferably the camera rig comprises grip portions. Preferably said grip portions are located on the outer frame. Where the frame is inflatable, said grip portions are located substantially adjacent to the periphery of the frame, distal to the camera support mean. Further, when the frame is inflatable, the grip portions may consist of apertures through the frame.

In order that the present invention be more readily understood specific embodiments thereof will now be described with reference to the accompanying drawings in which, FIG. 1 shows a front view of a first embodiment of a camera rig in accordance with the present invention; and FIG. 2 shows a front view of a second embodiment of a camera rig;

Figure 1:
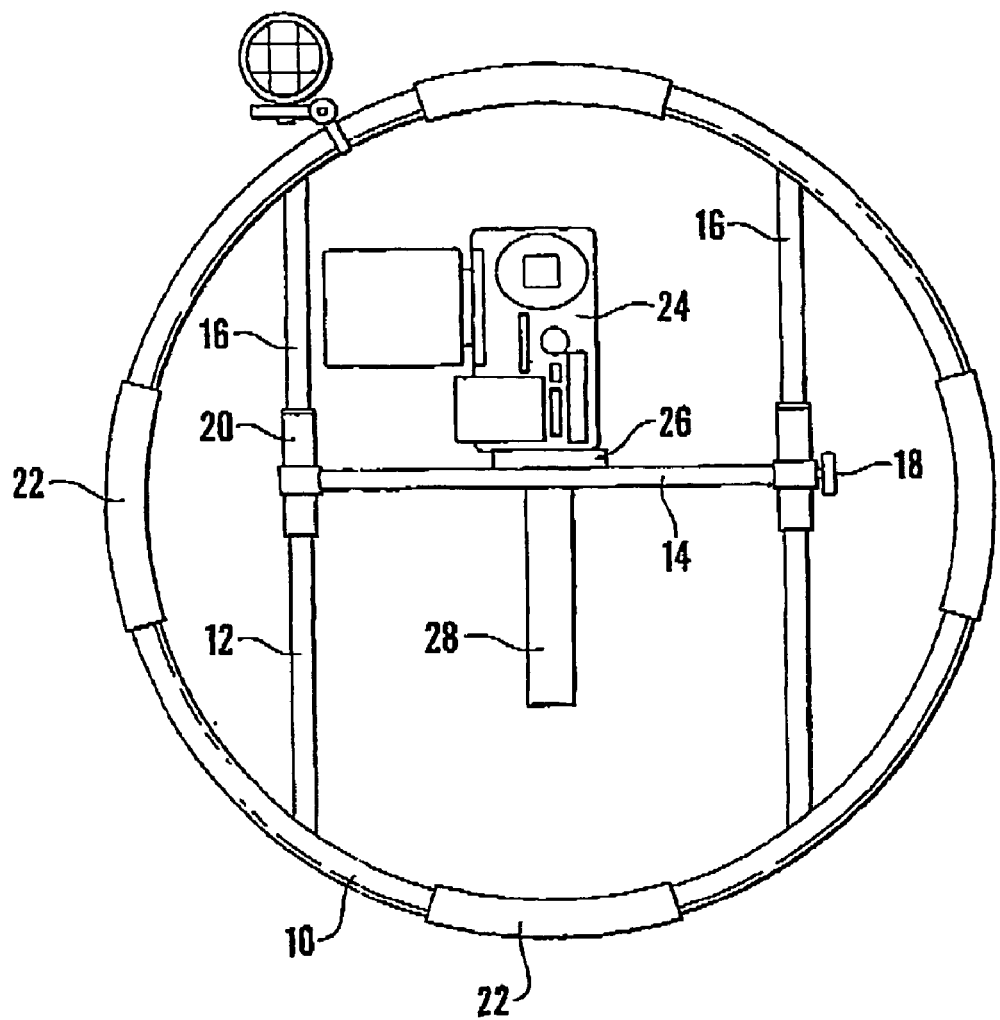

Referring to the drawings, and in particular FIG. 1 a camera rig comprises a circular frame 10. An H frame 12, having two upright outer bas 16 with a middle bar 14 extending between them, is affixed inside the circular frame 10. The middle bar 14 of the H frame 12 is moveable along the two outer bars 16. Each end of the middle bar 14 is fitted with a slider 20. The sliders are adapted to fit around the outer bar 16 and hence the middle bar is capable of moving along the outer bars. One of the sliders 20 comprises a means 18 tat allows the middle bar to be secured in any position along the outer bars 16. The se means may typically be a screw fixing.

The sliders comprise Teflon inserts to reduce fiction between he sliders and outer bars 16.

The circular frame comprises a plurality of grip portions 22 that aid in both alignment and ease of use. Usually the grip portions 22 will comprise rubber, however any similar material will suffice. In this example four such grip portions are provided, spaced equally around the circular frame.

In use a camera 24 is releasably secured to the middle bar via sport means 26. The position of the middle bar may then be adjusted according to the desired camera position. The moveable central bar also allows cameras of different sizes to be secured to the frame.

A handle 28 is attached to the side of the middle bar 14 remote from the securing means. The handle 28 allows a user to grip same for convenient attachment and removal of the camera 24 from the support means 26.

A user may then, free of the restraints of a tripod or other fixed support device, film quickly and steadily from a variety of locations.

It will also be appreciated that the circular frame offers protection to the camera against damage. Such protection is of great advantage consider the costs of cameras, and digital video cameras in particular.

Accessories, such as a microphone or light source, may be conveniently attached to the circular frame, thus allowing a user to carry all items together. This has numerous advantages, including that only one person is needed to perform the task and also that the various pieces of equipment can be positioned together.

Figure 2:
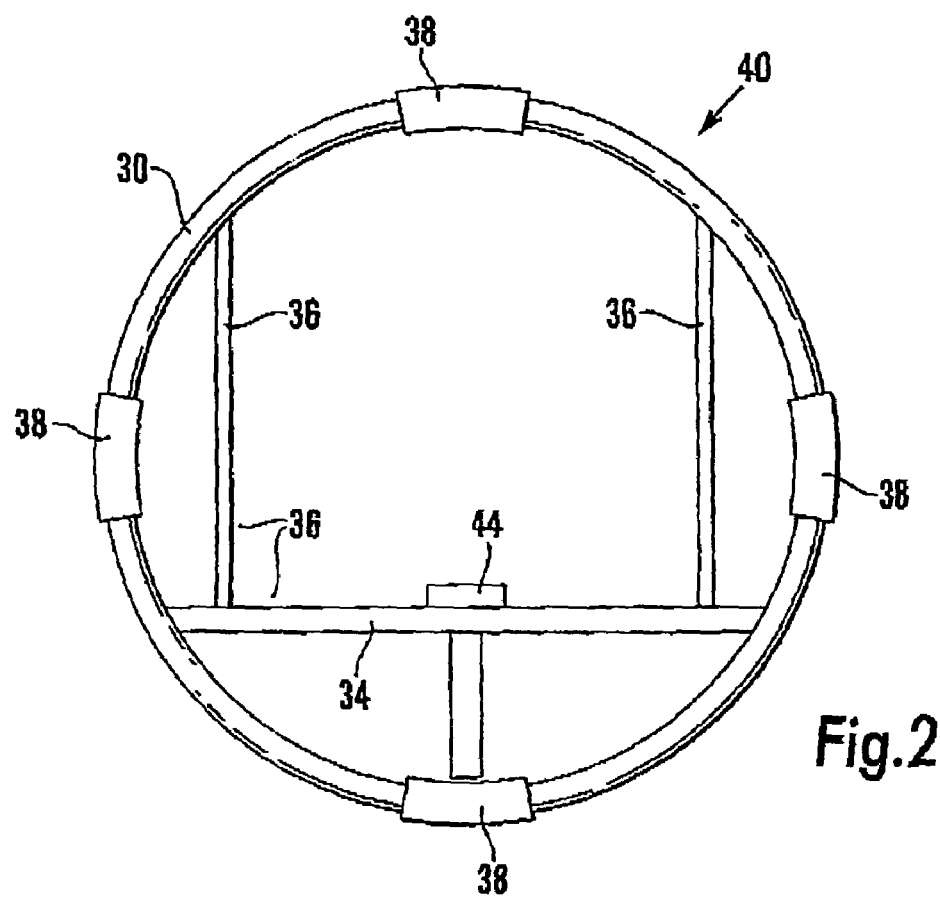

In FIG. 2 a second embodiment of a camera rig 40 is depicted wherein a circular frame 30 possesses an internal H frame 32. The H frame 32 is devoid of downwardly extending outer bars from the middle bar 34 of the file 32. In this second embodiment the H frame 32 is attached to the circular frame 30 at each end of the middle bar 34 and at the end of the upwardly extending outer bars 36. This forms a fixed rigid frame camera rig 40.

This camera rig 40 is equipped with two pairs of grip potions 38, each pair being present on opposite portions of the circular frame 30.

Figure 3:
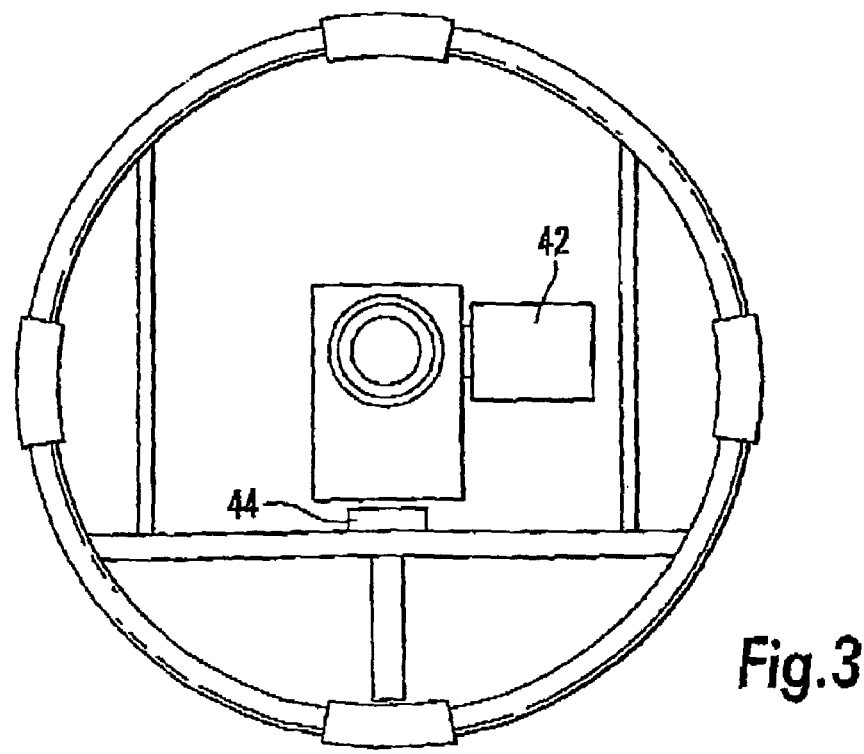
FIG. 3 shows a front view of the second embodiment in use.

The camera rig 40 is shown in use with a camera 42 in FIG. 3. The camera 42 being attached to the rig 40 via releasable engagement with support means 44.

Figure 4:
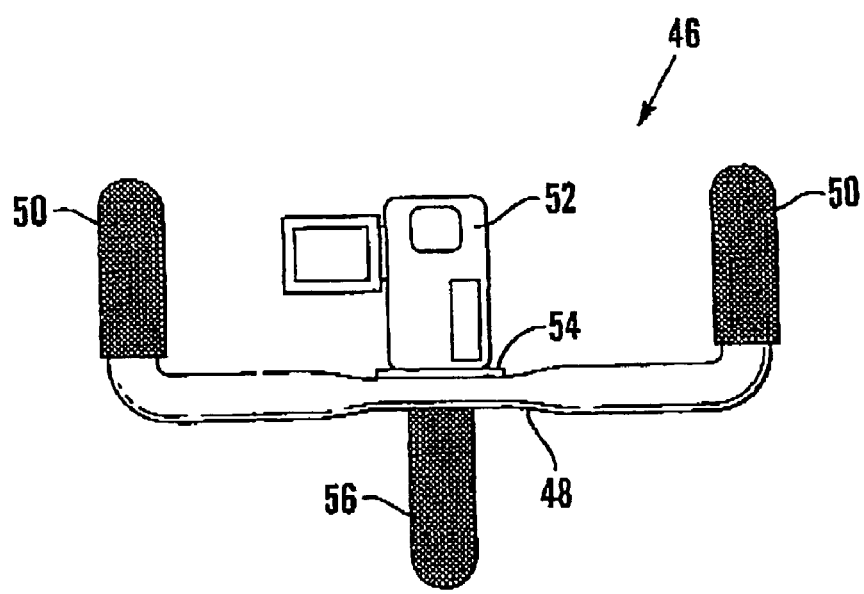
FIG. 4 shows a front view of a third embodiment of a camera rig in use.

A third embodiment of a camera rig is shown in FIG. 4. This rig 46 possesses a U-shaped frame 48 where the two grip portions 50 are located on the upwardly extending ends of the frame. The camera 52 is releasably secured to the centre of the frame 48 via support means 54. In this embodiment a handle 56 is provided. The handle possesses a screw thread (not shown) at the uppermost end thereof. This screw thread passes through an aperture (not shown) in the centre of the frame 48 and the supporting means to engage a threaded bore (not shown) in the camera 52 in order to hold same in engagement with supporting means 54.

Figure 5:
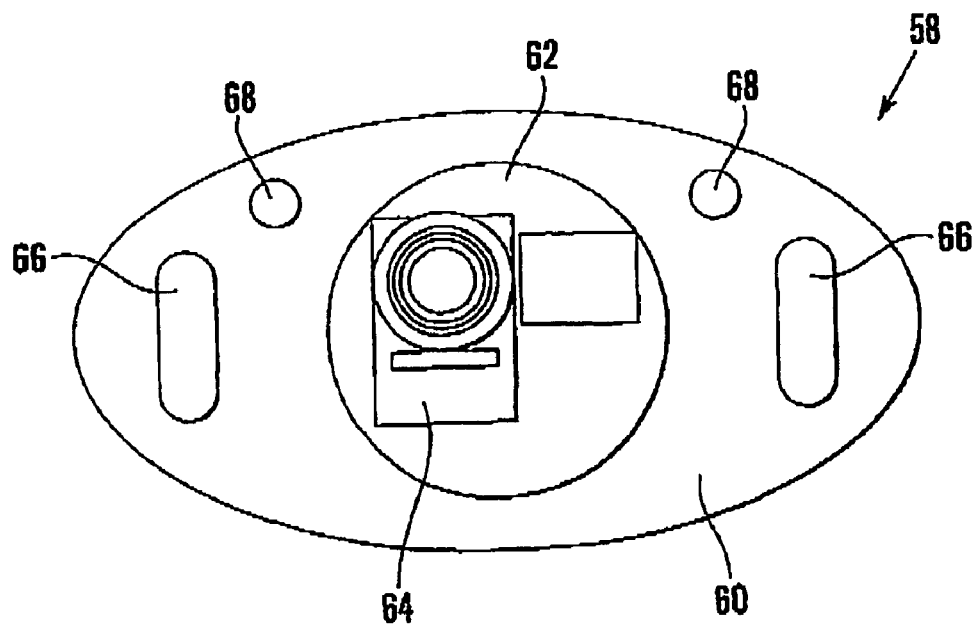
FIG. 5 shows a front view of a fourth embodiment of a camera rig in use.

A fourth embodiment of a camera rig 58 is shown in FIG. 5. This rig 58 consist of an inflatable frame 60 of elliptical shape which is made from welded PVC. There is a central aperture which is sized to fit a camera 64 therein.

A pair of grip portions 66 are formed from elongate apertures located at opposite ends of the frame 60 toward the tips thereof. The grip portions 66 are sized to allow a user's fingers to pass through in order to hold the frame.

The rig 58 is also provided with apertures 68 to allow the attachment of further items such as a light source or a microphone or the like.

It is to be understood that the above described specific embodiments are described by way of example only and that many variations or modifications are possible.

The invention claimed is:

1. A hand held digital video camera rig comprising a frame capable of securely holding a camera and at least one further piece of equipment, wherein the frame comprises a substantially contiguous and closed outer frame, and an inner frame mounted on the outer frame, and the inner frame comprising at least one substantially horizontal bar which is fixed rotationally relative to the outer frame and whereby, in use, a user is able to support the rig with only their hands.

2. A camera rig comprising a frame and a camera support means mounted on the frame, wherein the frame comprises a substantially contiguous and closed outer frame, and an inner frame mounted on the outer frame, and the inner frame comprising at least one substantially horizontal bar which is fixed rotationally relative to the outer frame.

3. A method of using a hand held camera rig consisting of attaching a camera to a camera rig as described in claim 2 or claim 1, by engagement of said camera to a camera support means, and a user supporting the rig with only their hands on the frame of the rig to shoot film with the camera.

4. A camera rig according to claim 2, wherein the inner frame is provided with the camera support means.

5. A camera rig according to claim 2, wherein at least a part of the inner frame is movable with respect to the remainder of the frame.

6. A camera rig according to claim 2, wherein the outer frame is substantially circular or substantially elliptical.

7. A camera rig according to claim 2, wherein the inner frame comprises an H frame.

8. A camera rig according to claim 7, wherein the centre bar of the H frame is capable of movement with respect to the remainder of the frame.

9. A camera rig according to claim 2, wherein a handle portion is provided to engage an opposite side of the frame to the camera support means.

10. A camera rig according to claim 2, wherein the frame is made from aluminum.

11. A camera rig according to claim 2, wherein the camera support means is integral with the frame.

12. A camera rig according to claim 2, wherein the inner frame additionally comprises at least one substantially vertical bar.

13. A camera rig according to claim 2, whereby a user is able to support the rig with only their hands.

14. A camera rig according to claim 2, wherein at least two grip portions are located on the outer frame.

15. A camera rig according to claim 2, wherein the frame is made from a hardened plastics material.

16. A camera rig comprising a frame and a camera support means mounted on the frame, wherein the frame comprises an outer frame and an inner frame mounted on the outer frame, and the inner frame comprising at least one substantially horizontal bar which is fixed rotationally relative to the outer frame, and at least one substantially vertical bar.

17. A camera rig comprising a frame and a camera support means mounted on the frame, wherein the frame comprises an outer frame and an inner frame mounted on the outer frame, and the inner frame comprising at least one substantially horizontal bar which is fixed rotationally relative to the outer frame, wherein the outer frame is one of substantially circular and substantially elliptical.

18. A camera rig comprising a frame and a camera support means mounted on the frame, wherein the frame comprises an outer frame and an inner frame mounted on the outer frame, and the inner frame comprises a H-frame which is fixed rotationally relative to the outer frame.

* * * * *